(12) United States Patent
Singh et al.

(10) Patent No.: US 10,400,564 B2
(45) Date of Patent: Sep. 3, 2019

(54) STAGED STEAM EXTRACTION OF IN SITU BITUMEN

(71) Applicant: Dow Global Technologies LLC, Midland, MI (US)

(72) Inventors: Harpreet Singh, Pearland, TX (US); Naoko Akiya, Missouri City, TX (US); Wu Chen, Lake Jackson, TX (US); Paul A. Gillis, Lake Jackson, TX (US); Abu Mokhtarul Hassan, Pearland, TX (US); Zubin B. Kuvadia, Houston, TX (US); Biplab Mukherjee, Pearland, TX (US); Jorge H. Pazmino, Pearland, TX (US); Defne Kayrak Talay, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 311 days.

(21) Appl. No.: 15/115,293

(22) PCT Filed: Mar. 18, 2015

(86) PCT No.: PCT/US2015/021253
§ 371 (c)(1),
(2) Date: Jul. 29, 2016

(87) PCT Pub. No.: WO2015/143034
PCT Pub. Date: Sep. 24, 2015

(65) Prior Publication Data
US 2017/0241250 A1 Aug. 24, 2017

Related U.S. Application Data

(60) Provisional application No. 61/968,480, filed on Mar. 21, 2014.

(51) Int. Cl.
*C09K 8/584* (2006.01)
*C09K 8/592* (2006.01)
*E21B 43/24* (2006.01)

(52) U.S. Cl.
CPC .......... *E21B 43/2408* (2013.01); *C09K 8/584* (2013.01); *C09K 8/592* (2013.01)

(58) Field of Classification Search
None
See application file for complete search history.

(56) References Cited

U.S. PATENT DOCUMENTS 3,396,792 A 8/1968 Muggee
3,454,095 A 7/1969 Messenger et al.
(Continued)

FOREIGN PATENT DOCUMENTS

| CA | 1061713 A1 | 9/1979 |
| CN | 103541705 A | 1/2014 |
| WO | 2008070990 | 6/2008 |

*Primary Examiner* — William D Hutton, Jr.
*Assistant Examiner* — Charles R Nold (57) ABSTRACT

The present invention relates to an in situ staged steam extraction method for removing petroleum products from a heavy oil or bitumen reservoir from subterranean locations. Specifically, each injection stage comprises a different steam composition. A steam composition may consist essentially of steam or may comprise one or more enhanced oil recovery agent.

8 Claims, 3 Drawing Sheets

(56) References Cited

U.S. PATENT DOCUMENTS

| | | | |
|---|---|---|---|
| 4,127,172 A * | 11/1978 | Redford | E21B 43/243 |
| | | | 166/261 |
| 6,230,814 B1 | 5/2001 | Nasr et al. | |
| 6,357,526 B1 | 3/2002 | Abdel-Halim et al. | |
| 7,464,756 B2 | 12/2008 | Gates et al. | |
| 7,938,183 B2 | 5/2011 | Hart et al. | |
| 2008/0139418 A1 | 6/2008 | Cioletti et al. | |
| 2009/0078414 A1 | 3/2009 | Horvath Szabo et al. | |
| 2013/0081808 A1 | 4/2013 | Zeidani et al. | |
| 2015/0107842 A1* | 4/2015 | Sood | E21B 43/2406 |
| | | | 166/306 |
| 2015/0307787 A1 | 10/2015 | Akiya et al. | |
| 2016/0069172 A1 | 3/2016 | Akiya et al. | |

\* cited by examiner

STAGED STEAM EXTRACTION OF IN SITU BITUMEN

FIELD OF THE INVENTION

The present invention relates to an in situ staged steam extraction method for removing petroleum products from a heavy oil or bitumen reservoir from subterranean locations.

BACKGROUND OF THE INVENTION

Bitumen recovery from oil sands is a challenging activity that requires accessing subterranean bitumen, extracting the bitumen from the subterranean sand and then recovering the bitumen from the subterranean location to above ground. There are numerous proposed methods for recovering bitumen from oil sands. The Background section of US Publication US2008/0139418 provides a review of many recovery methods including strip mining, cold flow technique, cyclic steam stimulation (CSS), steam assisted gravity drainage (SAGD) and vapor extraction process (VAPEX).

CSS and SAGD processes are "hot" processes (that is, thermal methods) that use hot steam to decrease the viscosity of subterranean bitumen. In these processes steam is injected down a first well into subterranean oil sands. The steam penetrates the sands and lowers the viscosity of bitumen by heating the oil sands, which facilitates flow of the bitumen through the sands into either the first well (CSS) or to a second well (SAGD) from which recovery of the bitumen occurs. With the CSS method, steam is injected into a well at temperatures of 250° C.-400° C. The well then sits for days or weeks during which time the steam heats bitumen in the subterranean environment around the well causing bitumen to drain into the well and after which hot oil mixed with condensed steam is pumped out from the well for weeks or months. Then the process is repeated. In the SAGD process two horizontal wells are drilled, one below the other (generally approximately five meters apart). Steam is injected into the upper well, heating bitumen in the surrounding subterranean environment thereby lowering the viscosity of the bitumen causing it to flow into the lower well. The resulting bitumen and condensed steam mixture is subsequently pumped to the surface from the bottom well. According to US Publication US 2008/0139418, recovery of bitumen from an oil sands reservoir by CSS is typically only about 20-25 percent (%) while recovery in SAGD processes is reportedly up to about 60% of the available bitumen in the oil sands reservoir.

A modified version of the SAGD process is also known. U.S. Pat. No. 6,230,814 describes what has become known as the expanding solvent steam assisted gravity drainage (ES-SAGD) process. The ES-SAGD process requires combining hydrocarbons with steam in a SAGD-type process so the hydrocarbons can solubilize bitumen in subterranean oil sands to further reduce bitumen viscosity to facilitate the drainage of bitumen into a second well hole for recovery to above ground. The reference identifies suitable additives as hydrocarbons having from one to 25 carbons.

Challenges of thermal methods include low recovery rate (40 to 60 percent of oil in place) and high energy and water usage. One approach to improving well performance (higher oil rate, higher recovery, or lowered steam usage) is by the addition of a chemical agent to the steam injection stream. The potential utility for several different types of chemicals has been demonstrated, including glycol ethers, amines, and surfactants, see U.S. Pat. Nos. 3,396,792 and 3,454,095; US Patent Application No. 2009/0078414 and 2009/0218099; and U.S. Provisional Application Ser. Nos. 61/806,067 and 61/739,279. However, continuous addition of such steam additives is expensive and impractical.

It would be desirable to have a steam enhanced recovery process that improves bitumen and/or heavy oil recovery rate while being economical viable.

BRIEF SUMMARY OF THE INVENTION

The present invention offers an in situ bitumen recovery process, referred to as Staged Steam Extraction (SSE) using steam compositions that provide an economical solution to the problem of increasing heavy oil and/or bitumen recovery percentages relative to current CSS, SAGD, and/or ES-SAGD processes.

In one embodiment, the present invention is a method for in situ recovery of a petroleum product from a subterranean heavy oil or bitumen reservoir comprising the steps of: (i) drilling one or more well within an oil-rich zone of a heavy oil or bitumen reservoir; (ii) injecting a first steam composition into a well; (iii) recovering the petroleum product from a well; (iv) injecting a second steam composition, different from the first steam composition, into a well; (v) recovering additional petroleum product from a well; (vi) optionally repeating one or more injection/recovery cycle (steps (iv) and (v)) as desired with a third, fourth, fifth, etc. steam composition; (vii) determining to terminate petroleum product recovery; and (viii) terminating petroleum product recovery, preferably the petroleum product is bitumen recovered from a subterranean bitumen reservoir.

One embodiment of the present invention is the method disclosed herein above wherein the injection well and the recovery well are the same well.

One embodiment of the present invention is the method disclosed herein above wherein two or more wells are drilled comprising the steps of: (i)(a) drilling one or more injection well within an oil-rich zone of a heavy oil or bitumen reservoir; (i)(b) drilling one or more production well located within the oil-rich zone of the heavy oil or bitumen reservoir; (ii)(a) injecting the first steam composition into an injection well; (iii)(b) recovering the petroleum product from a production well; (iv)(a) injecting the second steam composition, different from the first steam composition, into the injection well; (v)(b) recovering additional petroleum product from the production well; (vi) optionally repeating one or more injection/recovery cycle (steps (iv)(a) and (v)(b)) as desired with a third, fourth, fifth, etc. steam composition; (vii) determining to terminate petroleum product recovery; and (viii) terminating petroleum product recovery, preferably the one or more injection well is drilled horizontally to a depth located within the oil-rich zone and the one or more production well is drilled horizontally to a depth lower than and substantially parallel to the injection well located within the oil-rich zone.

One embodiment of the present invention is the method disclosed herein above wherein at least one steam composition consists essentially of steam.

One embodiment of the present invention is the method disclosed herein above wherein at least one steam composition comprises steam and one or more enhanced oil recovery agent in an amount of from 0.01 to 10 wt % based on total combined weight of steam and enhanced oil recovery agent, alternatively every steam composition comprises steam and one or more enhanced oil recovery agent in an amount of from 0.01 to 10 wt % based on total combined weight of steam and enhanced oil recovery agent, preferably the enhanced oil recovery agent is an alkane; benzene;

toluene; diesel; a $C_1$ to $C_{25}$ hydrocarbon; a $C_4$ to $C_{10}$ primary alcohol, a $C_4$ to $C_{10}$ secondary alcohol; a $C_4$ to $C_{10}$ tertiary alcohol; an alkyl alcohol alkoxylate; an alkylphenol ethoxylate; a tertiary acetylenic diol; an amino alcohol; ammonia; a primary amine; a secondary amine; a tertiary amine; a glycol; a glycol ether amine; an alkylene glycol ether; an anionic surfactant; an alpha olefin sulfonate; a fatty acid alkoxylate; or mixtures thereof, more preferably enhanced oil recovery agent is a monoethylene, a diethylene glycol of monohexyl ether, a triethylene glycol of monohexyl ether, a monoethylene glycol of 2-ethylhexyl ether, diethylene glycol of 2-ethylhexyl ether, a triethylene glycol of 2-ethylhexyl ether, a monoethylene glycol of 2-propylhepthyl ether, diethylene glycol of 2-propylhepthyl ether, a triethylene glycol of 2-propylhepthyl ether, 2- and (2-hexoxy-2-ethoxy)-1 aminoethane.

DETAILED DESCRIPTION OF THE INVENTION

The process of the present invention requires injecting a steam composition through a well into a subterranean location containing a heavy oil or bitumen reservoir. The subterranean location is desirably in or proximate to an oil sand deposit. Oil sand is also known as tar sands or bituminous sands. Oil sand is loose sand, or partially consolidated sandstone containing mixtures of sand, clay and water, that includes bitumen. Canada, Kazakhstan and Russia all contain large quantities of oil sand deposits. When applied to oil sands, the process of the present invention extracts bitumen from other components of the oil sands in a subterranean location by staged injection of steam compositions into the subterranean oil sand deposit to increase the flowability of the bitumen versus steam alone, thereby enabling the bitumen to drain from the oil sand components faster and eventually be recovered by pumping above ground. The process of the present invention avoids first having to remove oil sand from underground in order to extract bitumen from the removed oil sand as is required in a strip mining process. Instead, the present invention extracts bitumen from oil sands in situ, that is, in the subterranean location of the oil sand.

The steam composition of the present invention comprises steam and/or steam and an enhanced oil recovery agent. The steam compositions are desirably injected at a temperature and pressure sufficient to provide a steam composition at a temperature of 150° C. or higher, preferably 180° C. or higher and at the same time desirably a temperature of 300° C. or lower, preferably 260° C. or lower.

The steam in the steam composition can be superheated steam, saturated steam, less than 100 percent quality steam or any combination thereof. "Superheated steam" is steam that is at a temperature above the vapor-liquid equilibrium point of water. "Saturated steam" is synonymous with 100 percent quality steam. The quality of steam is a characteristic of how much liquid water phase is present in the steam. 100 percent quality steam has zero percent liquid phase water present. "Less than 100 percent quality steam" has liquid water present. A steam composition that is less than 100 percent quality steam can include the resulting composition from feeding a steam feed and a liquid aqueous phase feed together.

Enhanced oil recovery agents are known, for example see U.S. Pat. Nos. 3,396,792; 3,454,095; 3,782,472; 3,902,557; 5,110,487; 6,225,263; 6,230,814 and 7,938,183; US Publication No. 2009/0078414; 2009/0218099; and 2013/0081808; and U.S. Provisional Application Ser. Nos. 61/806,067 and 61/739,279, all of which are incorporated herein by reference in their entirety. A general class of compounds useful as enhanced oil recovery agents is surfactants. However, any enhanced oil recovery agent which improves petroleum product recovery is suitable for the method of present invention, for example, without limitation, alkanes; benzenes; toluenes; diesels; $C_1$ to $C_{25}$ hydrocarbons; $C_4$ to $C_{10}$ primary, secondary, and tertiary alcohols; alkyl alcohol alkoxylates such as alcohol ethoxylates, alcohol propoxylates, alcohol propoxylate ethoxylate, and alkylphenol ethoxylates; tertiary acetylenic diols including tertiary acetylenic diol ethoxylates; amino alcohols including monoethanolamine (MEA), diethanolamine (DEA), or triethanolamine (TEA); ammonia; amines including primary, secondary, and tertiary amines; glycols such as ethylene glycol and propylene glycol and derivatives therefrom; glycol ether amines; alkylene glycol ethers; anionic surfactants such as alkyl aryl benzene; alpha olefin sulfonates; fatty acid alkoxylates; and mixtures thereof. Preferred enhanced oil recovery agents are monoethylene, a diethylene glycol of monohexyl ether, a triethylene glycol of monohexyl ether, a monoethylene glycol of 2-ethylhexyl ether, diethylene glycol of 2-ethylhexyl ether, a triethylene glycol of 2-ethylhexyl ether, a monoethylene glycol of 2-propylhepthyl ether, diethylene glycol of 2-propylhepthyl ether, a triethylene glycol of 2-propylhepthyl ether, 2- and (2-hexoxy-2-ethoxy)-1 aminoethane.

Hydrocarbons suitable as an enhanced oil recovery agent include, without limitation, $C_1$ to $C_{25}$ hydrocarbons, and combinations thereof. Examples of suitable $C_1$ to $C_{25}$ hydrocarbons include, without limitation, methane, ethane, propane, butane, pentane, hexane, heptane, octane, nonane, decane, undecane, dodecane, tridecane, tetradecane, diluent, kerosene, naphtha and combinations thereof.

Another suitable enhanced oil recovery agent is ammonia or one or more amine. Suitable amines include any amine having a boiling point at atmospheric pressure no more than 135° C. and a $pK_a$ of at least 5.0. In another embodiment, the amine is any having a boiling point at atmospheric pressure no more than 145° C. and a $pK_a$ of at least 4.95. Exemplary amines include, but are not limited to: methyl amine, dimethyl amine, trimethyl amine, diethyl amine, ethyl amine, isopropyl amine, n-propyl amine, diethyl amine, 1,1-dimethyl hydrazine, isobutyl amine, n-butyl amine, pyrrolidone, triethylamine, methyl hydrazine, piperidine, dipropylamine, hydrazine, pyridine, ethylenediamine, 3-methoxypropylamine, N,N-diethylhydroxylamine, morpholine, pyrrole, and cyclohexylamine Amines that have both a low boiling point and a comparatively high $pK_a$ such as dimethyl amine (BP: $-1.7°$ C.; $pK_a=10.68$) can be desirable in some embodiments of the invention.

Another suitable enhanced oil recovery agent is a glycol ether amine. Such glycol ether amines are described by the following structure:

R—(OC$_2$H$_4$)$_x$—NH$_2$ or

R—(OCH$_2$CH(CH$_3$))$_y$—NH$_2$ wherein R is a C$_1$ to C$_6$ alkyl group or a phenyl group and x and y independently are 1 to 3. Examples of preferable glycol ether amines are preferably the glycol ether amine is 2-butoxy-1-aminoethane; 2-(2-methoxyethoxy)-1-aminoethane; 2-(2-butoxyethoxy)-1-aminoethane; 1-methoxy-2-aminopropane; 1-propoxy-2-aminopropane; 1-butoxy-2-aminopropane; 1-(2-methoxy-1-methylethoxy)-2-aminopropane; 1-(2-propoxy-1-methylethoxy)-2-aminopropane; 1-(2-butoxy-1-methylethoxy)-2-aminopropane; 1-[2-(2-propoxy-1-methylethoxy)-1-methylethoxy]-2-aminopropane; or 1-[2-(2-butoxy-1-methylethoxy)-1-methylethoxy]-2-aminopropane, more preferably 2-(2-methoxyethoxy)-1-aminoethane or 1-(2-methoxy-1-methylethoxy)-2-aminopropane.

Another suitable enhanced oil recovery agent is an alkylene glycol ether. The alkylene glycol ether is desirably volatile at the temperature, pressure and environment of the steam composition when injected into a well as described above. Preferably, the alkylene glycol ether forms an azeotrope with water in order to optimize efficiency in dispersion and transport in steam.

Suitable alkylene glycol ethers have the following chemical formula:

H(OR$_1$)$_n$OR$_2$ wherein:
R$_1$ is referred to herein as an alkylene unit or the simply the alkylene,
OR$_1$ is referred to as an alkylene glycol unit,
R$_2$ is referred to as an alkyl or aryl and OR$_2$ is an alkyl ether component or aryl ether component. R$_2$ can be a pure alkyl, pure aryl or it can be a substituted alkyl or aryl comprising elements other than carbon and hydrogen. "Pure" in this description means consisting of only carbon and hydrogen. Typically, R$_2$ consists of carbon and hydrogen atoms, and
n is equal to one or more, while in the broadest scope there is no known upper limit for n, it is desirable for n to be 10 or less, preferably 8 or less, still more preferably 6 or less, even more preferably 4 or less and can be 3 or less, even 2 or less and n can be one.

Specific examples of suitable alkylene glycol ethers include any one or any combination of more than one of the following: propylene glycol n-butyl ether (such as DOWANOL™ PnB glycol ether, DOWANOL is a trademark of The Dow Chemical Company), dipropylene glycol methyl ether (such as DOWANOL DPM glycol ether), dipropylene glycol n-propyl ether (such as DOWANOL DPnP glycol ether), propylene glycol n-propyl ether (such as DOWANOL PnP glycol ether), dipropylene glycol n-butyl ether (such as DOWANOL DPnB glycol ether), ethylene glycol monohexyl ether (for example, Hexyl CELLOSOLVE™ solvent, CELLOSOLVE is a trademark of The Dow Chemical Company), ethylene glycol mono-n-propyl ether (such as propyl CELLOSOLVE Solvent), diethylene glycol monohexyl ether, ethylene glycol mono-n-propyl ether (such as Propyl CELLOSOLVE Solvent), diethylene glycol monohexyl ether (such as Hexyl CARBITOL™ Solvent, CARBITOL is a trademark of The Dow Chemical Company), diethylene glycol monobutyl ether (such as Butyl CARBITOL Solvent) and triethylene glycol monobutyl ether.

As used herein, the term steam composition comprises steam (i.e., vaporized water with no intentionally added compounds, also referred to as consisting essentially of steam) and steam comprising one or more intentionally added compounds, such as one or more enhanced oil recovery agent. If an enhanced oil recovery agent is used in the steam composition of the present invention, the amount of enhanced oil recovery agent required in the steam composition to achieve improvement in heavy oil and/or bitumen extraction over steam alone may be surprisingly low. The steam composition can contain as little as 0.01 weight-percent (wt %) of enhanced oil recovery agent and still demonstrate an improvement in bitumen extraction over use to steam alone in the same process. Typically, the steam composition contains 0.05 wt % or more, more typically 0.1 wt % or more, more typically 0.2 wt % or more, and can contain 0.3 wt % or more, 0.4 wt % or more or 0.5 wt % or more enhanced oil recovery agent. At the same time, the steam composition can contain 25 wt % or less, yet preferably contains 10 wt % or less, more preferably 7 wt % or less, yet more preferably 5 wt % or less and can contain 4 wt % or less enhanced oil recovery agent. Excessive amounts of enhanced oil recovery agent cause the cost of the process to increase so lower concentrations of the enhanced oil recovery agent are desirable from a cost standpoint. The wt % of enhanced oil recovery agent is based on total combined weight of steam and enhanced oil recovery agent.

In its broadest scope, the present invention is independent from how to form the steam composition. For example, an aqueous solution of the enhanced oil recovery agent can be boiled to create the steam composition, the enhanced oil recovery agent (neat or as an aqueous solution) can be introduced to steam, the enhanced oil recovery agent can be pulsed introduced into the steam, or any combination thereof.

After injecting the steam composition into a subterranean location containing heavy oil or bitumen, the process further includes extracting the petroleum product, e.g., bitumen from the subterranean location to above the ground. The steam composition serves to cause the bitumen to become flowable allowing it to be pumped from underground to above ground. The process of the present invention can take the form of a cyclic steam stimulation (CSS) process where bitumen is pumped up the same well that the steam composition is injected, a steam assisted gravity drainage (SAGD) where bitumen is pumped up a second well other than the well through which the steam composition is injected into the ground, or conceivable a combination of both CSS and SAGD type processes.

Figure 1:
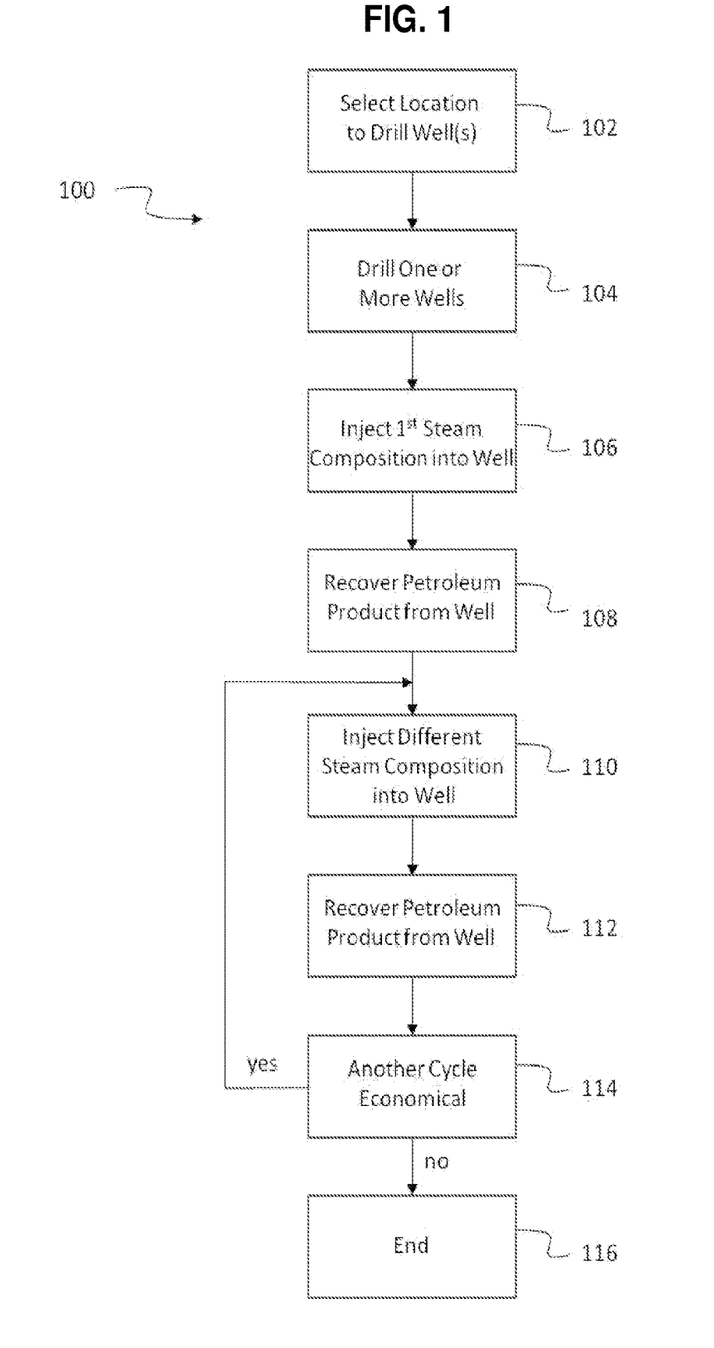
FIG. 1 is a flow chart showing one embodiment of the method of the present invention for Staged Stream Extraction of a petroleum product.

The process of the present invention may be applied to existing wells and/or new wells, FIG. 1. The wells, whether existing or new, are drilled into an oil-rich zone of a heavy oil or bitumen reservoir at a selected location 102. The well or wells may be drilled 104 vertical, horizontal, multi-lateral, at a slant or any combination thereof, or any extended reach well. Steam compositions are injected 106 into an injection well and hot fluids comprising petroleum product, and other components such as, but not limited to, condensate and gas flow out of a production well 108. The injection well may be the same or a different well as the production well.

The process of the present invention involves multiple or staged injections of different steam compositions. Initially a first steam composition is injected 106, petroleum product is recovered 108, a second steam composition is injected 110, and petroleum product recovered 112. After the recovering the petroleum product following the second steam injection the production recovery rate is determined to see if it is economical to continue production 114. If the answer is "yes" (step 114) then the process can begin again at step 110 wherein a third steam composition is injected into the injection well. The 2') injection/recovery cycle (114 to 110) may be repeated as many times as production is economical. Each subsequent time the injection/recovery cycle is repeated, a different steam composition is used, for example a third, fourth, fifth, sixth, seventh, eighth, ninth, tenth, etc. steam composition for the third, fourth, fifth, sixth, seventh, eighth, ninth, tenth, etc. cycle. Once the production decreases below an economic rate, production is terminated (the "no" branch of the decision step 114).

In one embodiment of the present invention the same well is used for injection and production. In this embodiment, two or more different steam compositions are sequentially injected into a well and the petroleum product is recovered, through the same well, between the first and second steam composition injection and after the second steam composition injection. Then the decision is made whether to/how many times to repeat the injection/recovery cycle until production rate is determined to be uneconomical then production is ended.

Figure 2:
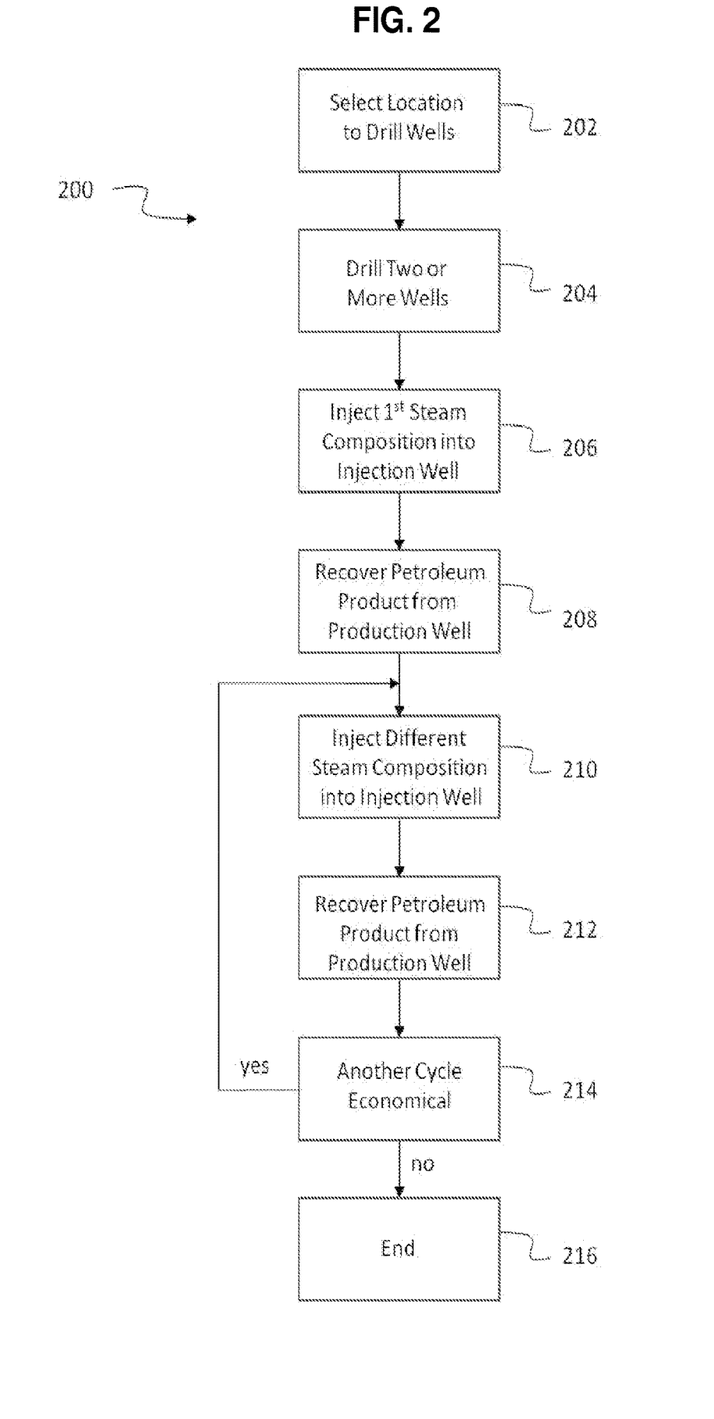
FIG. 2 is a flow chart showing another embodiment of the method of the present invention for Staged Stream Extraction of a petroleum product.

In another embodiment of the present invention, two or more wells are used with one or more first well used for injection and one or more second well used for recovery, FIG. 2. In this embodiment, the first steam composition is injected into a first well, or an injection well, followed by recovery of the petroleum product through a second well, or production well, then a second steam composition, different from the first steam composition, is injected in an injection well followed by recovery of the petroleum product from a production well. Then the decision is made whether to/how many times to repeat the injection/recovery cycle until production rate is determined to be uneconomical then production is ended.

In an embodiment of the present invention comprising the use of one or more well, the well is drilled vertically (CSS).

In another embodiment of the present invention comprising the use of one or more injection well and one or more production well, the one or more injection well is drilled horizontally (e.g., SAGD) to a depth located within the oil-rich zone and the one or more production well is drilled horizontally to a depth lower than, and preferably substantially parallel, to the one or more injection well located within the oil-rich zone.

It is known that steam alone or steam compositions comprising different enhanced oil recovery agents can demonstrate different levels of effectiveness in providing increasing in situ rates of petroleum products from subterranean heavy oil and bitumen reservoirs. Surprisingly, we have found that different steam compositions, comprising different enhanced oil recovery agents or different concentrations of the same enhanced oil recovery agents, demonstrate different efficiencies at extracting petroleum products depending on the degree of oil saturation (e.g., the amount of heavy oil or bitumen present in the formation). Further, we have found that staged injections (e.g., injections at different points in time within the life of a well) of different steam compositions may maximize petroleum product recovery from a heavy oil or bitumen reservoir by requiring fewer steam composition injections and/or by recovering an overall higher percent petroleum product by the end of life of the well.

It may be desirable that a first enhanced oil recovery agent in a first steam composition has a different volatility than a second enhanced oil recovery agent in a second steam composition.

In one embodiment of the present invention, a first enhanced oil recovery agent has a volatility that is less than the volatility of a second enhanced oil recovery agent.

In another embodiment of the present invention, the volatility of a first enhanced oil recovery agent is the same as the volatility of a second enhanced oil recovery agent.

In yet another embodiment of the present invention, the volatility of a first enhanced oil recovery agent is less than the volatility than a second enhanced oil recovery agent. For example, as a steam chamber matures, e.g., grows in size, as subsequent steam compositions are injected, it may be desirable for the enhanced oil recovery agents in the subsequent steam compositions to be more volatile. Greater volatility may enable greater mobility of the enhanced oil recovery agent throughout and/or across the steam chamber to reach the edge where most of the bitumen recovery in the more mature chamber is expected.

According to the method of the present invention, the oil production rate over time can be improved by dividing the total steam composition injection phase into two or more stages, with a different enhanced oil recovery agent or a same enhanced oil recovery agent with different concentration being selected for each stage. The enhanced oil recovery agent or the concentration when using just one enhanced oil recovery agent for injection would be selected based on its performance for enhancing oil drainage in porous media under the range of oil saturation expected in the reservoir in a given stage. An enhanced oil recovery agent can be a single chemical compound or a blend of two or more chemical compounds intended to enhance bitumen production through different mechanisms (e.g., bitumen-water interfacial tension (IFT), wetting of sand surfaces, etc.).

One specific embodiment of this invention is to use an additive that is more effective at high oil saturation as a well start-up agent (either during bull-heading or right after steam re-circulation is complete) and to switch to another additive that is more effective at lower oil saturation after the steam chamber has been established.

Another embodiment of the present invention is to use a steam composition comprising one or more enhanced oil recovery agent in a reservoir that has already been treated for some time with SAGD, in which case the steam compositions that are most effective from medium to low oil saturation can be injected sequentially over two or more stages.

Another embodiment of the present invention is injecting a steam composition having a lower concentration of an enhanced oil recovery agent injected at higher oil saturation, followed by the injection of the same enhanced oil recovery agent at higher concentration as the oil saturation in the formation decreases with time.

Flow through porous media is predominantly guided by the competing effects of gravitational and capillary forces. While the gravity force favors the flow of oil and hence in the recovery, the capillary effect tends to retard the flow of oil. Not to be held to a specific theory, we believe at higher oil saturation, the gravity force dominates and it is easier for the oil to flow through the porous reservoir formation. Addition of an enhanced oil recovery agent can reduce the capillary effect by altering the interaction mechanisms in the bitumen-water-sand system (e.g., reduce IFT), which can lead to better petroleum product recovery compared to when no agent is used. With time the oil saturation decreases and a greater fraction of the unrecovered oil remain in the reservoir formation as (a) disconnected patches of thin oil films on the sand surfaces and (b) trapped in smaller sized pores. The recovery of oil from films may occur via stripping of and formation of small sized oil droplets, which eventually gets entrained in the downward flowing condensed water stream and is recovered. Droplet size is known to be directly related to IFT, which mean formation of smaller size droplets would need greater reduction in IFT. This necessitates better IFT reduction for recovering oil from thinner oil films, at lower oil saturation. The reduction in IFT is possible either by increasing the additive concentration or by using a different additive.

To aid the petroleum product recovery from films at low oil saturation an enhanced oil recovery agent that favorably reduces oil-sand interaction (i.e., alter wettability) can also be used in tandem with an additive that lowers IFT. Similarly, oil trapped in smaller pores, at low oil saturation, can be recovered by reducing the IFT and/or changing the wettability of sand surfaces. Reductions in IFT and/or appropriate altering the sand wettability allow waters to better penetrate smaller sized pore throat and force out any trapped oil. Thus, oil production rate over time would be expected to be improved by dividing the total additive injection phase into two or more stages, with a different additive or a same additive with different concentration being selected for each stage.

EXAMPLES

The oil sands used in Examples 1 to 6 is a high-grade mined oil sand from Alberta Innovates Technology Futures sample bank. The amount of bitumen present in the oil sands (original oil in place—OOIP) is 12.5 percent by weight of the total oil sands. The porosity and hence, the oil saturation of the sand pack depends on the level of compression. Given the same OOIP on the weight basis, a more compact bed will have higher oil saturation as a result of the smaller pore volume being occupied by a larger fraction of oil.

Figure 3:
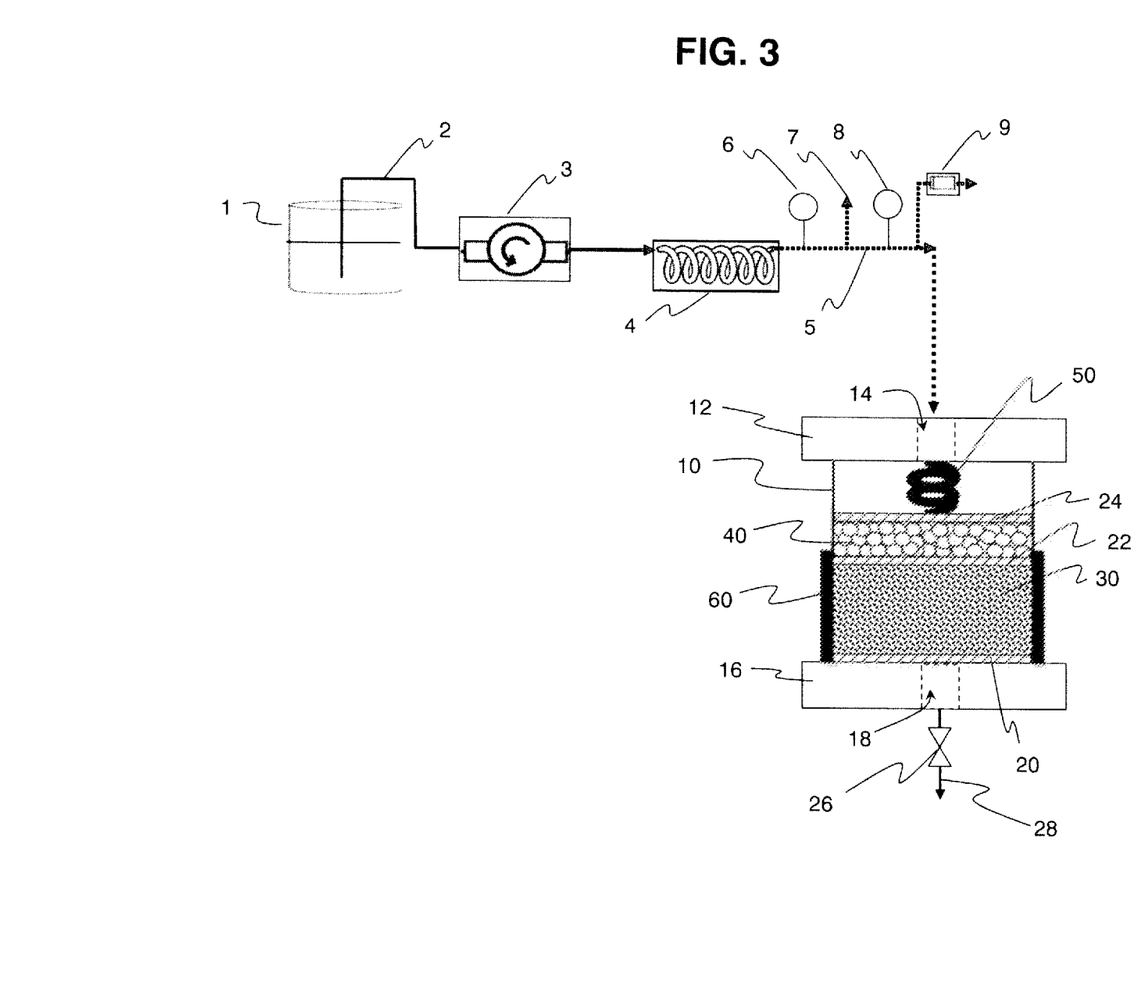
FIG. 3 provides an illustration of a test apparatus used to determine bitumen extraction efficiency in Experiments 1 to 3.

The examples use a set up similar to that illustrated in FIG. 3 to simulate steam assisted extraction of bitumen from oil sands. A solution tank 1 holds an aqueous solution that is pumped through line 2 via a pump 3 into a temperature controlled steam generator 4 to produce a steam composition at desired pressure (monitored by pressure gauge 6) and temperature (monitored by a thermocouple 8) which is then directed through line 5 to the core holder 10. Line 5 comprises a vent 7 and a rupture disk 9. The flow rate of the water or additive solution is kept constant at 4.5 ml/min.

The core holder 10 has a lid 12 with entrance opening 14 defined there through and opposing bottom 16 with exit opening 18 defined there through. Within container 10 place the following in order: screen 20 over bottom 16 so as to cover exit opening 18, 100 grams of oil sands 30 over screen 20, screen 22 covering oil sand 30, a layer of glass beads 40 covering screen 22, screen 24 covering glass beads 40 and spring 50 under compression and positioned between lid 12 and screen 24 so as to hold the contents of container 10 in place. Heater 60 is located around container 10 so as to heat the oil sand 30 to a steam saturation temperature during the experiment.

To simulate an oil sands formation at different stages of recovery, the oil sand bed 30 is compacted within the core holder 10 to different heights. Compacting is achieved using an INSTRON™ compression device having a load frame and a load cell (not shown in FIG. 3). Force is applied to the oil sand bed 30 at a fixed rate till it reaches the desired force and is then held for 30 minutes. For Examples 1 to 6, three different saturations are simulated: 1) hand packing results in a bed height of 4.8 cm corresponding to an oil saturation of 39 percent by weight of the total oil sands, 2) using a load cell of 1 kN (235 lbf), a bed height of 4.55 cm is achieved corresponding to a oil saturation of 45 percent by weight of the total oil sands, and 3) using a higher load cell, a bed height of 4.2 cm is achieved which corresponds to an oil saturation of 53 percent by weight of the total oil sands.

To simulate oil recovery, inject steam composition, into entrance opening 14 and maintain the injection pressure at 0.8 megaPascals (MPa) for one hour and then increase the pressure to 1.6 MPa for another hour. Set heater 60 to the saturation temperature during each stage. Collect discharge from container 10 through exit opening 18.

A steam composition is injected into the opening 14 at 4.5 ml/min (liquid water equivalent volume). In the examples, the aqueous solution used to generate steam comprises no enhanced oil recovery agent (e.g., is just water) or water and 4000 ppm diethylene glycol of monohexyl ether as an enhanced oil recovery agent. The compositions of the steam compositions for Examples 1 to 6 are given in Table 1.

The percent bitumen recovery is determined at two points in the process. An Initial Weight-Percent Recovery is determined based on the amount of oil in the discharge collected over the first 20 minutes of the process. A Final Weight-Percent Recovery is determined based on the amount of bitumen in the discharge collected over the full two-hour process. The amount of bitumen extracted at each interval is determined by a toluene extraction of the discharge. The toluene extraction method includes mixing toluene with the discharge mixture, isolating the toluene layer, evaporating the toluene to isolate the extracted bitumen and then weighing the extracted bitumen. The percent bitumen recovery is determined for the two points in the process by dividing the combined weight of the extracted bitumen by the weight of the bitumen in the original oil sand material. The weight of bitumen in the original oil sand is determined by doing a toluene extraction of a sample of the original oil sand having a known weight. From the known weight of the oil sand sample and the weight of bitumen extracted in the toluene extraction the weight percent bitumen in the oil sand is readily calculated by dividing the extracted bitumen weight by the known oil sand weight and multiplying by 100. This value can be used to determine how 3 much bitumen was in the oil sand used in the experiments by first measuring the weight of the oil sand prior to injecting the steam composition.

Table 1 provides the results for Examples 1 to 6.

TABLE 1

| Example | 1 | 2 | 3 | 4 | 5 | 6 |
|---|---|---|---|---|---|---|
| Steam Composition | | | | | | |
| Diethylene glycol of monohexyl ether, ppm | 0 | 4000 | 0 | 4000 | 0 | 4000 |
| Oil Recovery, % | | | | | | |
| @ 39 wt % | 25 | 33 | | | | |
| @ 45 wt % | | | 35 | 47 | | |
| @ 53 wt % | | | | | 46 | 39 |

The monotonic oil recovery trend for the steam composition without an enhanced oil recovery agent (Examples 1, 3, and 5) is consistent with what could be expected based on the oil-water relative permeability curves. The maximum in oil recovery trend of Examples 2, 4, and 6 comprising an enhanced oil recovery agent is unexpected and shows that there is an optimal performance range for an additive versus the oil saturation level of the formation.

What is claimed is:

1. A method for in situ recovery of a petroleum product from a subterranean heavy oil or bitumen reservoir comprising the steps of:
   (i) drilling one or more wells within an oil-rich zone of a heavy oil or bitumen reservoir;
   (ii) performing a first injection cycle by injecting a first steam composition into an injection well of the one or more wells;
   (iii) performing a first recovery cycle by recovering the petroleum product from a recovery well of the one or more wells;
   (iv) performing a second injection cycle by injecting a second steam composition into the injection well, the second steam composition being different from the first steam composition and including one or more enhanced oil recovery agents in an amount of from 0.01 to 10 wt % based on a total combined weight of steam and the one or more enhanced oil recovery agents, the one or more enhanced oil recovery agents being selected from a diethylene glycol of monohexyl ether, a triethylene glycol of monohexyl ether, a monoethylene glycol of 2-ethylhexyl ether, a diethylene glycol of 2-ethylhexyl ether, a triethylene glycol of 2-ethylhexyl ether, a monoethylene glycol of 2-propylhepthyl ether, a diethylene glycol of 2-propylhepthyl ether, a triethylene glycol of 2-propylhepthyl ether, and a 2-(2-hexoxy-2-ethoxy)-1 aminoethane;
   (v) performing a second recovery cycle by recovering additional petroleum product from the recovery well; and
   (vi) determining to terminate petroleum product recovery or to repeat one or more of the first injection cycle and the first recovery cycle and the second injection cycle and the second recovery cycle.

2. The method of claim 1 wherein the injection well and the recovery well are the same well.

3. The method of claim 1, wherein the first steam composition consists essentially of steam.

4. The method of claim 1, wherein the first steam composition comprises steam and one or more second enhanced oil recovery agent in an amount of from 0.01 to 10 wt % based on a total combined weight of steam and the one or more second enhanced oil recovery agent.

5. The method of claim 4 wherein the one or more second enhanced oil recovery agents is selected from an alkane; benzene; toluene; diesel; a $C_1$ to $C_{25}$ hydrocarbon; a $C_4$ to $C_{10}$ primary alcohol, a $C_4$ to $C_{10}$ secondary alcohol; a $C_4$ to $C_{10}$ tertiary alcohol; an alkyl alcohol alkoxylate; an alkylphenol ethoxylate; a tertiary acetylenic diol; an amino alcohol; ammonia; a primary amine; a secondary amine; a tertiary amine; a glycol; a glycol ether amine; an alkylene glycol ether; an anionic surfactant; an alpha olefin sulfonate; a fatty acid alkoxylate; and mixtures thereof.

6. The method of claim 4 wherein the one or more second enhanced oil recovery agent is selected from a diethylene glycol of monohexyl ether, a triethylene glycol of monohexyl ether, a monoethylene glycol of 2-ethylhexyl ether, a diethylene glycol of 2-ethylhexyl ether, a triethylene glycol of 2-ethylhexyl ether, a monoethylene glycol of 2-propylhepthyl ether, a diethylene glycol of 2-propylhepthyl ether, a triethylene glycol of 2-propylhepthyl ether, and a 2-(2-hexoxy-2-ethoxy)-1 aminoethane.

7. The method of claim 4 wherein the first steam composition comprises a first enhanced oil recovery agent of the one or more second oil recovery agent and the second steam composition comprises a second enhanced oil recovery agent of the one or more oil recovery agent, wherein the first enhanced oil recovery agent has a different volatility than the second enhanced oil recovery agent.

8. The method of claim 1 wherein the petroleum product is bitumen recovered from a subterranean bitumen reservoir.

* * * * *